(No Model.) 3 Sheets—Sheet 3.
C. BURKELMAN.
PORTABLE ROOFING TANK APPARATUS.
No. 409,912. Patented Aug. 27, 1889.
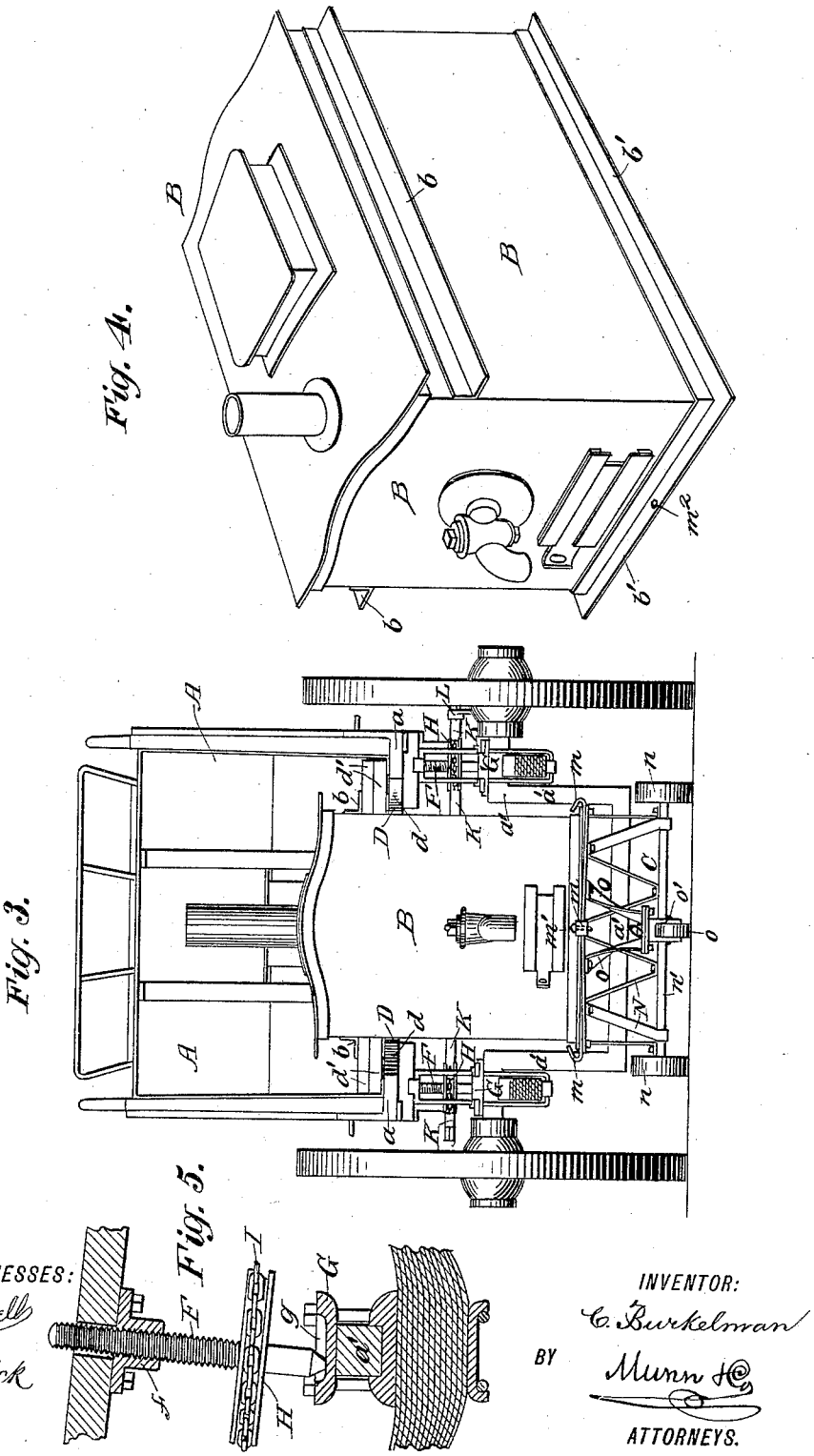
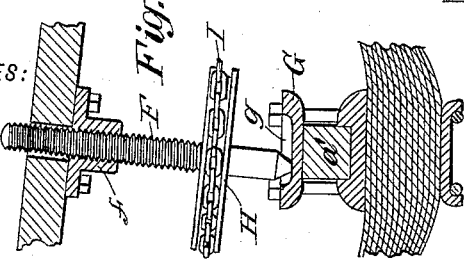
WITNESSES:
INVENTOR:
C. Burkelman
BY Munn &Co.
ATTORNEYS.
N. PETERS, Photo-Lithographer, Washington, D. C.

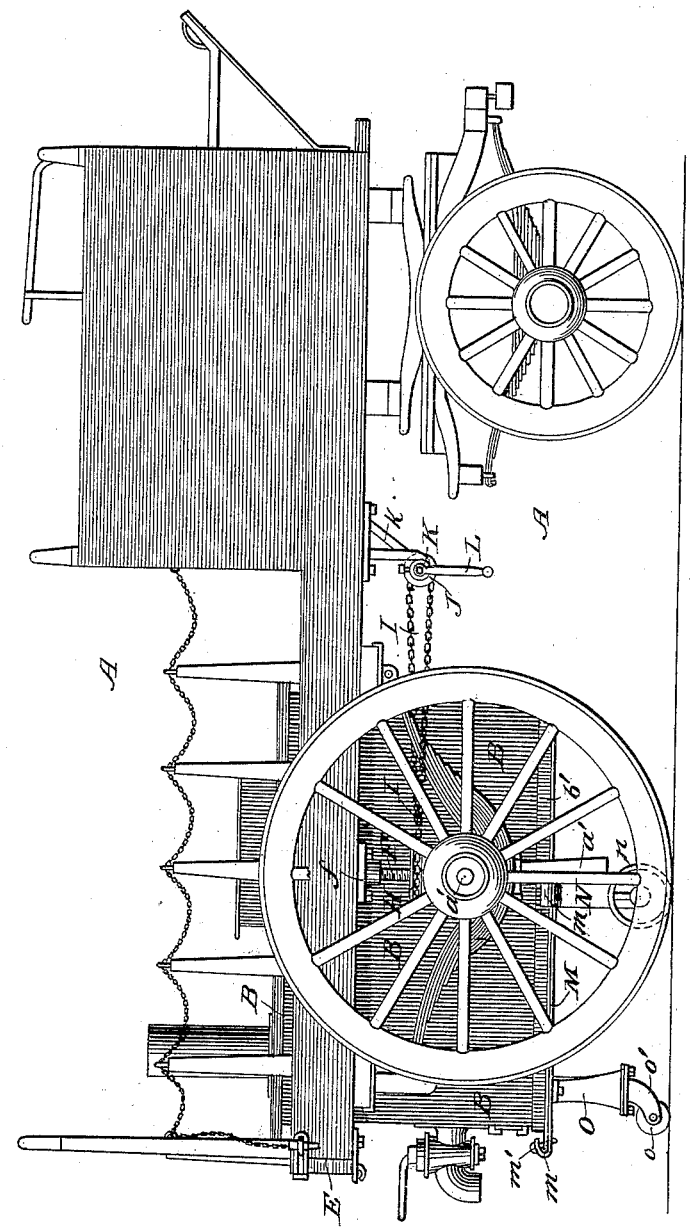

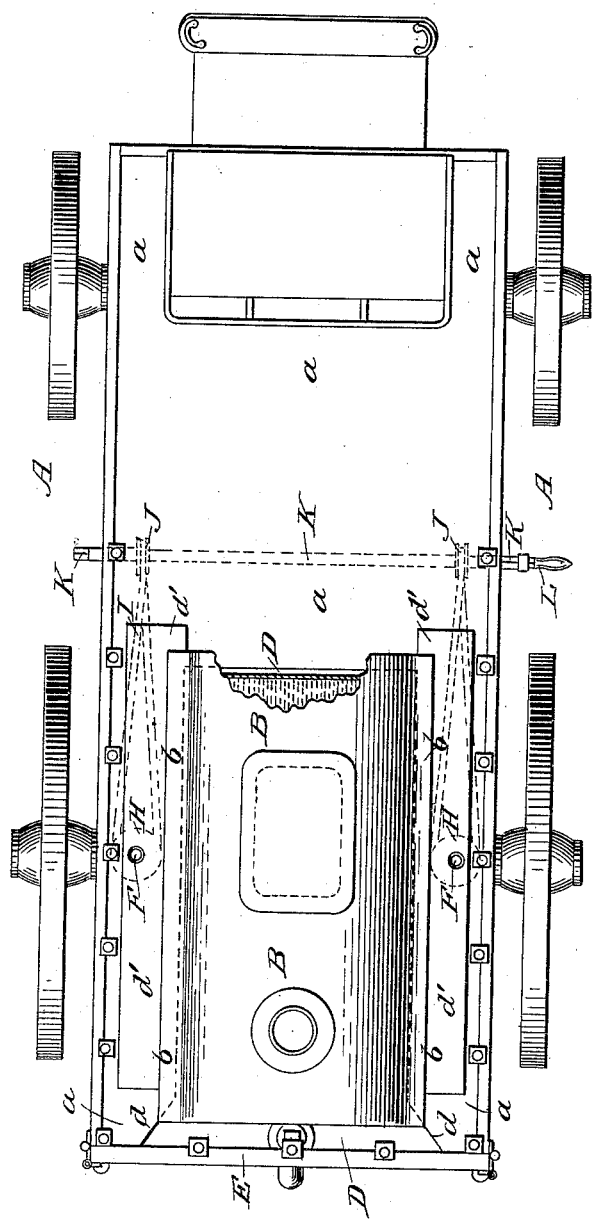

UNITED STATES PATENT OFFICE.

CHARLES BURKELMAN, OF NEW YORK, N. Y.

PORTABLE ROOFING-TANK APPARATUS.

SPECIFICATION forming part of Letters Patent No. 409,912, dated August 27, 1889.

Application filed May 13, 1889. Serial No. 310,493. (No model.)

*To all whom it may concern:*

Be it known that I, CHARLES BURKELMAN, of New York, in the county and State of New York, have invented a new and Improved Portable Roofing-Tank Apparatus, of which the following is a full, clear, and exact description.

My invention relates to an apparatus designed more especially for transporting tanks or kettles used for melting tar or other substances employed in roofing or sheathing buildings; and the invention has for its object to provide an efficient, comparatively inexpensive, and durable apparatus of this character, allowing the same truck to be used to convey any number of tanks to or from different buildings, thus largely economizing time and labor when compared with other apparatus of this kind, wherein the tank or kettle is a fixture on the truck which supports it, or is arranged in a different manner.

The invention consists in certain novel features of construction and combinations of parts of the roofing-tank apparatus, all as hereinafter described and claimed.

Reference is to be had to the accompanying drawings, forming a part of this specification, in which similar letters of reference indicate corresponding parts in all the views.

Figure 1 is a side elevation of my improved portable roofing-tank apparatus. Fig. 2 is a plan view thereof. Fig. 3 is a rear end view thereof with the main truck tail-board removed. Fig. 4 is a rear perspective view of the tank, and Fig. 5 is a detail vertical sectional view of one of the tank-sustaining screws of the truck and adjacent parts.

My improved apparatus includes a main wheeled truck A, a tank or kettle B, to be transported by said truck, and a detachable truck C, adapted to the tank for supporting it at the place of use. I will particularly describe these parts in the order above named, as follows: The main truck A is preferably made with four wheels supporting front and rear axles, which sustain the truck-platform $a$ by means of springs applied in any ordinary or approved way. The rear axle $a'$ of the truck is bent downward at its center to give room for the tank or kettle B, which is adapted to enter an opening D, made in the rear part of the truck-platform to receive it. The truck is preferably provided with a removable tail-board E, which is applied after the tank is in place on the truck. Those parts of the truck-platform $a$ at each side of the tank-opening D are cut away at $d\ d$ at an angle to provide for the easy entrance of the tank into said opening as the truck is backed onto or around the tank. I also provide four separate planks $d'$, which may be used to close the opening D, and thus form a continuous truck platform or bed, allowing the truck to be used for hauling bags of gravel, paper sheathing, or other materials commonly used for roofing purposes, or for general trucking when it is not in use for transporting the tar kettle or tank from one job to another. I utilize these loose platform-planks $d'$—two at each side of the truck-opening D—as a re-enforce to the truck-platform $a$ to help it sustain the heavy tank B, which is provided with opposite side flanges $b\ b$, which rest on top of the planks, as shown more clearly in Figs. 2 and 3 of the drawings.

An important feature of my invention consists in the use of a device or devices on the main truck adapted to lift the truck-platform and tank while utilizing the truck-axle as a resistance piece or bar. I am not limited to any particular mechanical power or appliance by which this may be accomplished, as I may use levers, cams, or other devices; but to do the work easily and safely I prefer to use and specially claim two screws F F, which are threaded into nuts $f\ f$, secured to the truck-platform $a$ immediately over the rear axle $a'$, and are stepped in slot-recesses $g$ of metal foot-blocks G, which are shackled to the horizontal end parts of the axle. These screws incidentally pass upward through the truck-platform $a$ and its auxiliary tank-supporting planks $d'$ and may be operated directly by any suitable wrench or lever applied to them; but I prefer to operate both screws simultaneously from either side or both sides of the truck by gearing next described.

Each of the screws F carries fixedly a chain-wheel H, around which passes the bight of an endless chain I, which extends forward to and around another chain-wheel J, fixed to a shaft K, which is sustained transversely of the truck in suitable bracket-bearings $k$, bolted to the truck-platform. Both ends of the shaft K are squared or flattened to receive the eye of a crank L, which may be applied for turning the shaft, and thereby operating the screws F F for raising or lowering the truck-platform. A crank L may be applied at each end of the shaft K, if desired.

The truck C of the tar tank or kettle B is made with a bed or platform M, having a general triangular form and consisting of metal plates bolted together at their ends, which are turned upward and inward to form hooks $m$, which are adapted to receive a flange $b'$, formed at the bottom of the tank. These hooks $m$ are open sufficiently to allow a little vertical play of them on the tank-flange to allow more easy engagement of the truck with the tank. The front of the tank-truck is sustained directly on a skeleton frame N, formed of riveted metal plates, which are connected at their lower ends to the truck-axle $n'$, on which the two front wheels $n$ $n$ of the truck are journaled. The rear or pilot wheel $o$ is journaled in a bearing $o'$, which is swiveled to a comparatively narrow frame or bracket O, formed of metal plates bolted to the narrow end or point of the triangular truck-frame. A pin $m'$, passed through the rear truck-hook $m$ and through a hole $m'$ in the rear flange $b'$ of the tank B, locks the removable truck C in place on the tank. It will be noticed that the screws F pass upward into or through holes in the loose platform planks $d'$, when they are in position to sustain the tank B, and thus prevent displacement of the planks by the tank as the truck is being backed around the tank.

The operation is very simple and effective, as follows: Figs. 1 and 3 of the drawings show the relative positions of the parts after the truck A, with its tail-board E off, had been backed into the tank, which had entered the opening D of the truck-platform and the tail-board E had been applied. The crank L will now be turned in proper direction to rotate the screws F and raise the back end of the truck-body $a'$, while the screws bear onto the plates G on the axle, and in the recesses $g$ of which plates the screws slip backward as they are canted over by the rising truck-body, and as will be understood from Fig. 5 of the drawings. The screws will be turned to lift the main truck-platform from three to five inches, or a distance sufficient to take up the depression of the truck-springs by the tank having a lighter or heavier load of tar in it, and a little farther—say about one-half an inch—which latter distance is sufficient to lift the tank bodily, as it rests by its side flanges $b$ on the truck-platform planks $d'$, and thereby relieve the tank-truck C of all weight of the tank, whereupon the pin $m'$ will be withdrawn and the truck C will be rolled out from under the tank and placed on the main truck A. The shaft K will be turned by the crank L in the other direction to lower the truck-platform $a$ until the screws F are relieved of the weight of the tank, which now will be sustained by the truck-springs, and the main truck may now be driven off with the tank to another job or to the shop. When the tank B is to be unloaded from the main truck A, the tank-truck C will be lifted from the truck A, and after the tank has been raised sufficiently by operating the screws F the truck C will be slipped in under the tank, with the flange $b'$ of which the truck-hooks $m$ will be engaged, and after the screws F have been turned the other way to allow the tank to settle down firmly onto the truck C, which rests on the ground or floor, and when the tail-board E of the main truck is removed said truck may be hauled forward, leaving the tank or kettle B on its truck C, and the main truck may then be driven off to load another tank or kettle onto it, in the manner above described. It will be noticed that the loose fit of the tank-truck hooks $m$ onto the base-flange $b'$ of the tank allows the hooks to be engaged with the tank-flange while the truck C is rolled on its own wheels under the tank, and without requiring nicety of relative vertical adjustment of the tank or bodily lifting of its truck.

The tank is provided with the usual or any approved inlet for the tar or other roofing material to be melted, and an outlet therefor, and also has a suitable fire-box provided with a feeding-door and a smoke-flue. When the tank rests on its own truck C at the place of use, I propose to block up its front end next its fire-door by a fuel-box, which will thus hold the fuel conveniently at hand and will prevent accidental forward tipping of the tank, the front wheels of which are placed but little forward of its center to allow the main truck to back onto the tank without causing its axle $a'$ to strike the tank-truck, as will readily be understood.

Having thus described my invention, I claim as new and desire to secure by Letters Patent—

1. In portable tank apparatus, the main truck having a depressed axle, and an opening at its rear part allowing the truck to be backed around the tank, substantially as described, whereby the truck-body is adapted to sustain the tank by and above its bent axle, as set forth.

2. In portable tank apparatus, the main truck provided with an opening in its body allowing the truck to be backed around the tank, and provided also with a removable tail-board or piece applicable behind the loaded tank, substantially as herein set forth.

3. In portable tank apparatus, the main truck provided with an opening in its body allowing the truck to be backed around the tank, said body or platform being beveled off laterally at the rear of the tank-opening to guide the truck around the tank, substantially as herein set forth.

4. In portable tank apparatus, the main truck having a depressed axle and a rear body-opening, combined with a tank adapted to enter said opening above the bent axle, and provided with flanges or supports adapted to sustain it on the truck body or platform, substantially as herein set forth.

5. In portable tank apparatus, the main truck provided with a rear body or platform opening and loose planks adapted to close said opening, combined with a tank having lateral flanges or supports sustaining it on the loose planks laid on the truck-platform at each side of its tank-opening, substantially as herein set forth.

6. In portable tank apparatus, the combination, with a main truck provided with a rear body or platform opening, of a tank adapted to said opening and having flanges or supports sustaining it on the main truck-body, and a detachable truck adapted to the tank to support it when unloaded from the main truck, substantially as herein set forth.

7. In portable tank apparatus, the combination, with a main truck having a rear body-opening and a rear axle depressed at its center below said opening, of a tank adapted to the opening and having flanges or supports which sustain it on the main truck-body above the bent axle, and a detachable truck fitted to the tank in rear of the depressed main truck-axle, substantially as herein set forth.

8. In portable tank apparatus, the combination, with a main truck having a rear body-opening, of a tank adapted to said opening and provided with flanges or supports for sustaining it on the truck-body, and devices, substantially as specified, interposed between the truck body and axle for raising the body and thereby lifting the tank for loading it onto the main truck, substantially as herein set forth.

9. In portable tank apparatus, the combination, with a main truck having a rear body-opening, of a tank adapted to said opening and provided with flanges or supports for sustaining it on the truck-body, and screws threaded into nuts on the truck-body and stepped in bearings above the truck-axle, substantially as described, for the purposes set forth.

10. In portable tank apparatus, the combination, with a main truck having a rear body-opening, a depressed axle, wheels thereon, and springs on said axle sustaining the truck-body, of screws threaded into nuts on the truck-body and stepped in bearings above the truck-axle and springs, substantially as herein set forth.

11. In portable tank apparatus, the combination, with a main truck having a rear body-opening adapted to receive a tank, and screws threaded into nuts on the truck-body, one at each side thereof, and stepped at the truck-axle, of wheels on the screws, a transverse shaft on the truck, wheels on said shaft, and chains connecting the shaft and screw-wheels, substantially as described, for the purposes set forth.

12. In portable tank apparatus, the combination, with a main truck having a rear body-opening, of a tank having upper flanges or supports sustaining it on the truck-body within its opening and provided also with a bottom flange, and a detachable wheeled truck for the tank made with hooks which loosely engage the bottom flange of the tank, substantially as herein set forth.

13. In portable tank apparatus, the combination, with a main truck having a rear body-opening, of a tank having upper flanges or supports sustaining it on the truck-body within its opening and provided also with a bottom flange, and a detachable truck made with three hooks engaging the bottom flange of the tank at two sides and the rear and provided with two forward wheels and one rear pilot-wheel, substantially as herein set forth.

14. In portable tank apparatus, the combination, with a main truck having a rear body-opening and a tank adapted for support by the truck within said opening, of loose planks on the truck-body at each side of the tank-opening, and screws threaded to nuts on the truck-body and stepped above the axle and adapted to raise the truck-body and tank for loading the tank onto the truck, said screws passed through the loose planks to hold them in place to receive the tank as the truck backs onto and around it, substantially as herein set forth.

CHARLES BURKELMAN.

Witnesses:
HENRY L. GOODWIN,
C. SEDGWICK.